Patented Nov. 8, 1932

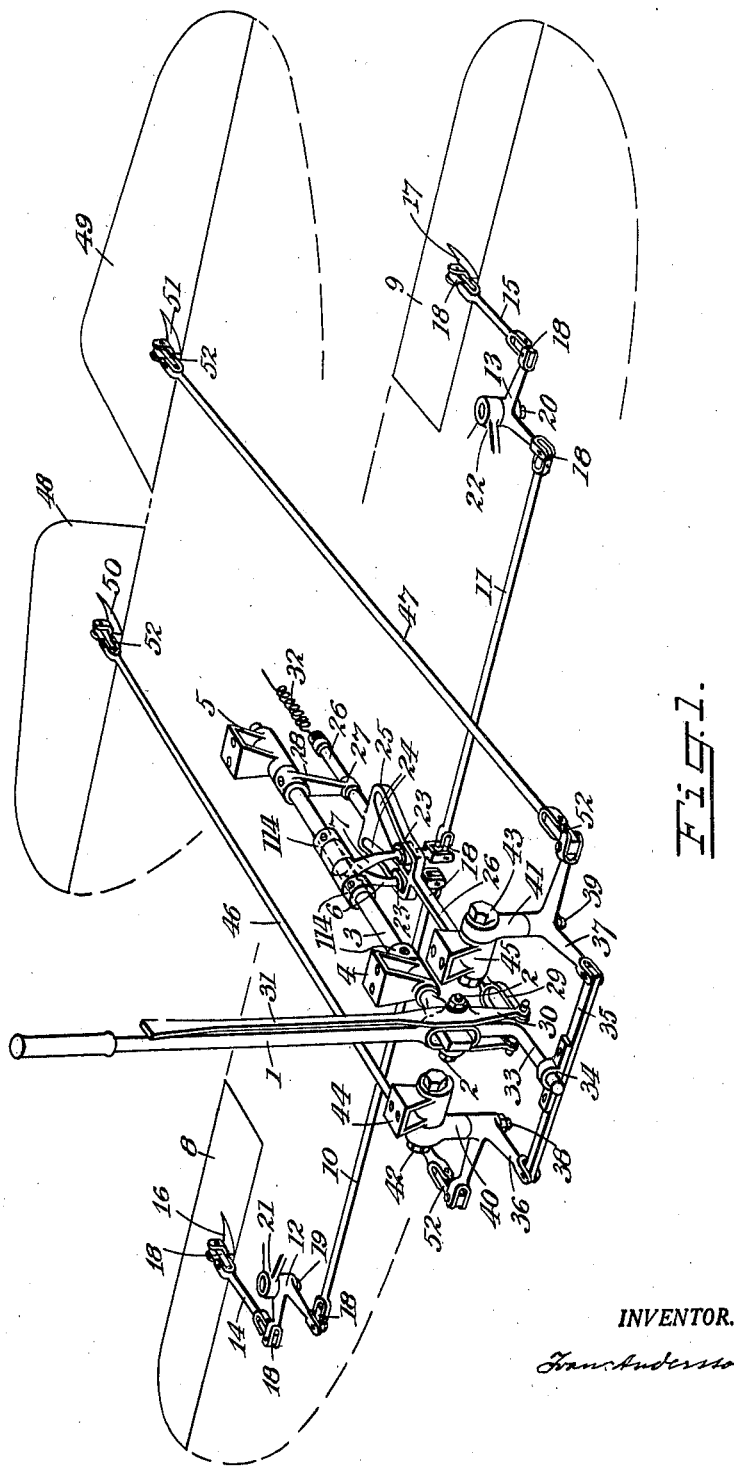

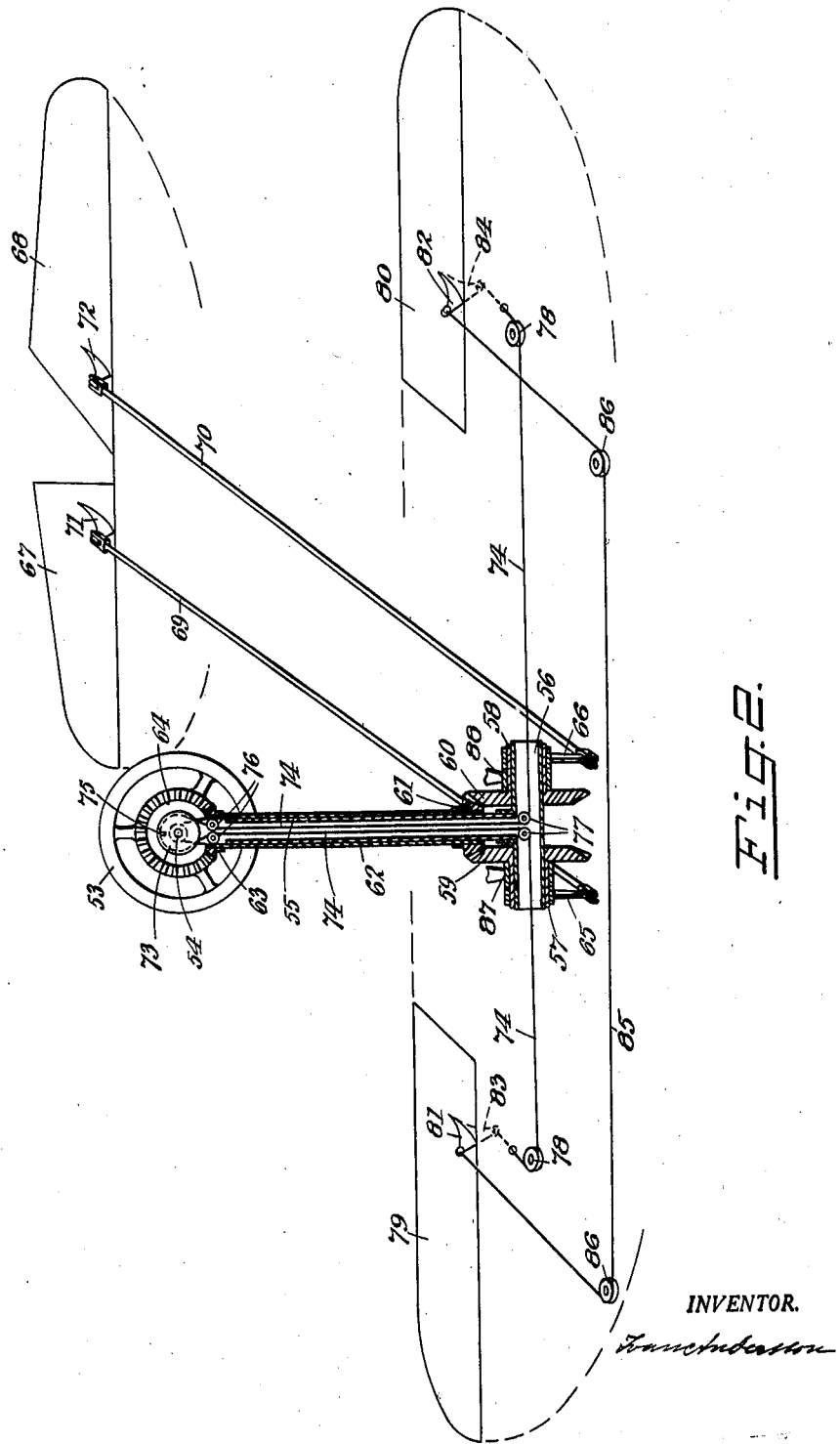

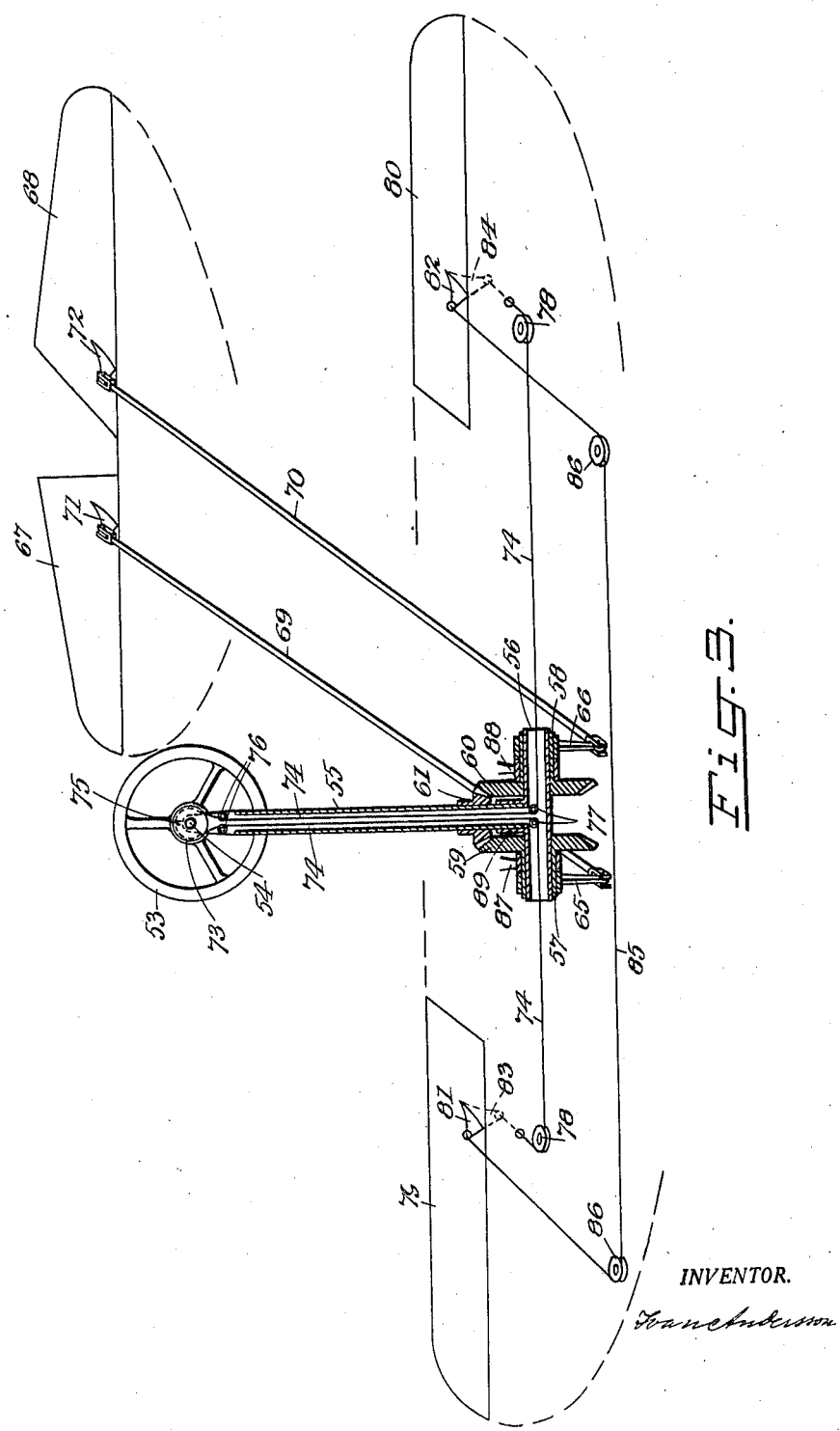

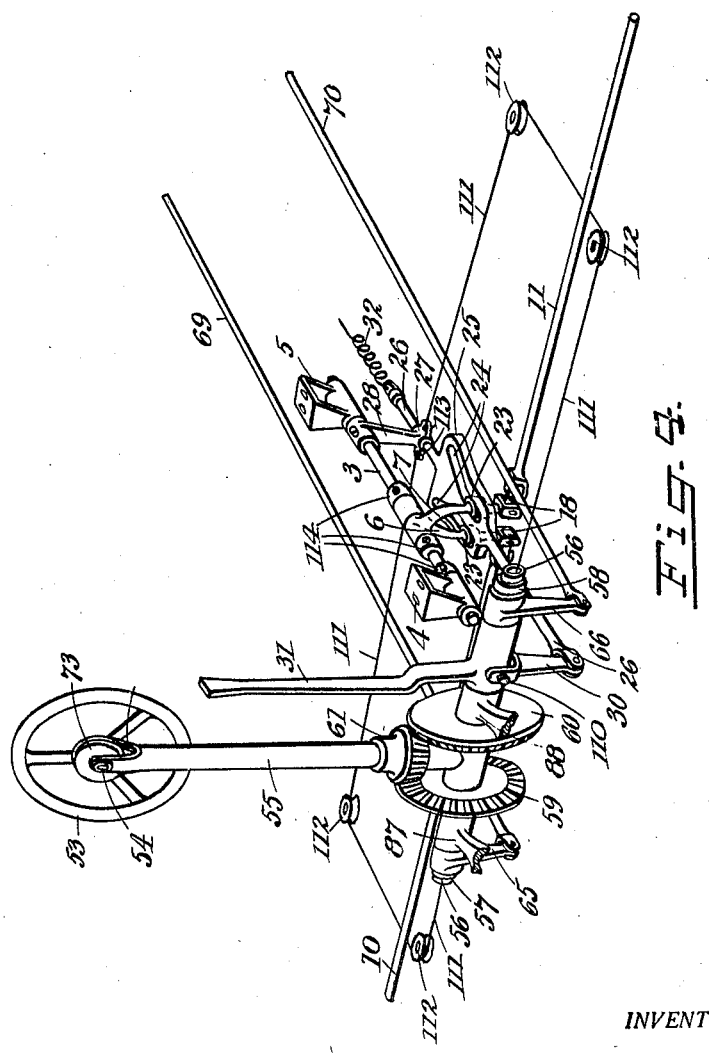

1,886,932

UNITED STATES PATENT OFFICE

IVAN ANDERSSON, OF EAST HARTFORD, CONNECTICUT

AIRPLANE

Application filed April 11, 1931. Serial No. 529,517.

The present invention refers to improvements in airplane controls and has for its object to provide means for better maintaining the lateral balance of airplanes. Another object is to provide means for operating the ailerons as lifting flaps without interfering with the lateral control of the airplane.

When an airplane travels at high angle of incidence the speed may become so low that not enough pressure is produced on the ailerons to correct any lateral tilting of the plane which may ultimately turn over on its side and go into a tail spin.

To prevent this, according to the present invention, the elevators are so arranged and connected to the control column or control stick, that they can either be operated as elevators, that is moved in the same direction at the same time, or operated as ailerons, that is moved in opposite directions at the same time, or operated both as elevators and as ailerons at the same time, that is partly moved in the same directions, partly in opposite directions at the same time.

The elevators are generally more or less struck by the slip-stream from the propeller, which mostly travels at a high speed. They can therefore, even if the airplane travels at low speed, effectively be operated as ailerons to set up a useful rolling moment to counteract any lateral tilting of the plane. They may equally well be used for maintaining the lateral balance when the ailerons are used as lifting flaps.

The accompanying drawings illustrate examples of the present invention as applied to different controls.

Figure 1 showing in perspective the general arrangement of the invention applied to the stick control, the ailerons and elevators working together for lateral control, elevators working independently for longitudinal control and ailerons workable as lifting flaps.

Figure 2 shows diagrammatically the invention applied to a wheel control with control column and associated parts in section where the ailerons and the elevators work together for lateral control, and the elevators working independently for longitudinal control.

Figure 3 is a diagrammatic view of the invention applied to a wheel control with the column and associated parts in section where the ailerons and the elevators work independently for lateral control and the elevators independently for longitudinal control.

Figure 4 shows in perspective the invention applied to a wheel control similarly as illustrated in Fig. 3 combined with means for operating the ailerons as lifting flaps similarly as illustrated in Fig. 1.

In Fig. 1, (1) is the control stick pivoted on the studs (2) which are carried at one end of the horizontal spindle (3), said spindle being mounted in the bearings (4) and (5). On the same spindle are loosely mounted two arms (6) and (7) which are connected to the ailerons (8) and (9) by the rods (10) and (11), bell crank levers (12) and (13), links (14) and (15) and horns (16) and (17), the connections between the adjacent parts being made through universal joints (18). The bell crank levers (12) and (13) are pivoted on studs (19) and (20) carried by brackets (21) and (22). On the two arms (6) and (7) are mounted the horizontal rollers (23) which are held in two diverging cam slots (24) cut in the plate (25). This plate (25) is carried by a rod (26) the one end of which slides in the bearing (27) of the arm (28) which is rigidly mounted on the spindle (3). The other end, which is preferably formed into a fork (29), is connected to the one end (30) of a hand lever (31) which is pivoted on the same studs (2) as the control stick (1). The rod (26) and the cam plate (25) are held in their normal position by the spring (32). Furthermore, below the studs (2), the control stick (1) has been prolonged and bent so that the end (33) protrudes forward at an angle of about 90 degrees to the stick (1). This end of the stick is mounted in a bearing (34) carried by a link (35) which inter-connects two bell crank levers (36) and (37). These bell crank levers are pivoted on studs (38) and (39) which are normally hanging vertical and protruding from the bosses (40) and (41) which are mounted on horizontal pivots (42) and (43) carried by the brackets (44) and (45). The said pivots (42) and (43) are so mounted that their axes are in line with the axes of the studs (2) on spindle (3). Two arms of the bell crank levers (36) and (37) are inter-connected by the link (36) as stated and the other two arms are connected by the rods (46) and (47) with the elevators (48) and (49) through the horns (50) and (51), the connections between the adjacent parts being made through universal joints (52). The bearings (4) and (5) and brackets (21), (22), (44) and (45) are rigidly attached to some suitable members of the airplane.

The working of the construction is as follows: By pushing the control stick towards the front the stick end (33) will move toward the rear and through the bearing (34) and link (35) swing the bell crank levers (36) and (37) on the horizontal pivots (42) and (43) toward the rear, pushing the rods (46) and (47) toward the rear and causing, through the horns (50) and (51), the elevators to swing down. By pulling the control stick back the stick end (33) will move toward the front and through the bearing (34) and link (35) swing the bell crank levers (36) and (37) on the horizontal pivots (42) and (43) toward the front, pulling the rods (46) and (47) toward the front and causing, through the horns (50) and (51), the elevators to swing up. By moving the control stick (1) sideward to the right the stick end (33) will, by means of the bearing (34) and link (35), turn the bell crank levers (36) and (37) on their vertical pivots (38) and (39), pulling the rod (46) toward the front and pushing the rod (47) toward the rear which through the horns (50) and (51) cause the elevator (48) to swing up and elevator (49) to swing down. By moving the control stick sideward toward the left the reverse movement will take place causing the elevator (48) to move down and elevator (49) to move up. This is what happens to the elevators on the different movements on the control stick. Considering the working of the ailerons it is obvious, that on the back or forward movement of the stick the ailerons are not affected as the spindle (3), on which the arms (6) and (7) are mounted for operating the ailerons, has not been moved. It will be noted that on the back or forward movement of the stick (1) the hand-lever (31) remains still in its normal position due to the spring (32) but on a sideward movement of the stick, the hand-lever (31) and arm (28) will rock with the spindle (3) and will swing the rod (26) and the cam plate (25) and cause the levers (6) and (7) to swing likewise, which through rods (10) and (11), bell crank levers (12) and (13), links (14) and (15) and horns (16) and (17) will cause the ailerons (8) and (9) to swing in opposite directions. That is, if, the stick is moved toward the right the levers (6) and (7) will swing toward the left causing the aileron (8) to be pulled up and the aileron (9) to be pushed down which agrees with the movement of the elevators. By moving the stik towards the left the levers (6) and (7) will swing toward the right causing the aileron (8) to be pushed down and the aileron (9) to be pulled up. To increase the lift of the wings both ailerons can be pushed down. This is accomplished by pulling the hand-lever (31) back causing the lower end (30) of the hand-lever to move toward the front pulling the rod (26) and cam plate (25) forward. The rollers (23) mounted on arms (6) and (7) and running in the cam slots (24) which are diverging will cause the arms (6) and (7) to swing in opposite directions and move apart, thereby causing, through the rods (10) and (11), the bell crank levers (12) and (13), the links (14) and (15) and the horns (16) and (17), the ailerons (8) and (9) to swing down. These are kept down as long as the hand-lever is kept in its backward position against the action of the spring (32) which when the hand-lever is released will return said hand-lever and ailerons to the normal position.

Applying the invention to a wheel control as shown in Fig. 2, where the wheel (53) is mounted on the spindle (54) carried on the upper end of the control column (55) which is mounted on the horizontal hollow spindle (56). On said spindle are loosely mounted the sleeves (57) and (58) which carry bevel gears (59) and (60). These bevel gears mesh with a bevelgear (61) carried by the sleeve (62) which is loosely mounted over the control column. This sleeve carries at the upper end another bevelgear (63) which meshes with the bevelgear (64) rigidly mounted on the spindle (54) and moving with the hand wheel (53). On the sleeves (57) and (58) are rigidly mounted arms (65) and (66) which are connected with the elevators (67) and (68) by means of rods (69) and (70) and horns (71) and (72). On the aforesaid spindle (54) is also rigidly mounted a pulley (73) over which runs a cable (74) and which is attached to the pulley at (75). This cable, which runs down through the hollow control column and out through the hollow spindle (56), is guided by pulleys (76) and (77) inside the control column and horizontal spindle, and by pulleys (78) mounted in the wings, and is connected to the ailerons (79) and (80) by means of the lower horns (83) and (84). The upper horns (81) and (82) are inter-connected by means of a cable (85) running over guide pulleys (86). The sleeves (57) and (58) are journalled in the bearings (87) and (88).

The working of this control is as follows: When moving the control column back or forward the lower bevelgear (61) carried on the control column will turn the bevelgear (59) and (60) back or forward but both in the same direction and cause the arms (65) and (66), which are mounted on the same sleeves (57) and (58) as the bevelgears, to move back or forward and push or pull the rods (69) and (70), thereby causing both the elevators (69) and (68) to swing down or up. The ailerons in this case remain unaffected. But by turning the wheel (53) to the right or to the left the bevelgear (64) will turn the bevelgear (63) and with it the sleeve (62) which will through the bevelgear (61) turn the two bevelgears (59) and (60) in opposite directions thereby causing the arms (65) and (66) to rock in opposite directions and through the rods (69) and (70) and horns (71) and (72) swing the elevators (67) and (68), one up and the other down which will then set up a rolling moment and assist the ailerons. At the same time as the elevators are operated the ailerons have been moved by the cable (74) which runs over the pulley (73) which is being turned together with the bevelgear (64).

In Fig. 3 the control has been modified by removing the sleeve (62) and the upper bevelgears (63) and (64) and by rigidly mounting the lower bevelgear (61) direct on the column (55). This column is here so mounted in a socket (89) on the horizontal spindle (56) that it can be rotated round its vertical axis. Other parts of the control are similar with identical parts shown in Fig. 3. The elevators (67) and (68) are moved together up or down as before for longitudinal control and the ailerons (79) and (80) are operated as before through the cables (74) and (75) by turning the wheel (53). To operate the elevators for lateral control the control column (55) is rotated around its axis in one or the other direction, whichever the case may be, thereby causing the bevelgear (61) to turn the bevelgears (59) and (60) in opposite directions. This causes the arms (65) and (66) to turn in opposite directions whereby the leveators (67) and (68), through the rods (69) and (70), and horns (71) and (72), will swing in opposite directions and produce a rolling moment to counteract any lateral tilting of the plane. It is seen that in this case the lateral control by the elevators is independent of the lateral control by the ailerons and is worked by a separate movement of the control column.

When using wheel control the ailerons may be used as lifting flaps in the same way as when using a stick control by connecting the cable (111) Fig. 4, which runs over the pulley (73) and is guided by pulleys (112), to the arm (28) which is rigidly mounted on the spindle (3), the pulley (73) being turned by means of the wheel (53) as before. The cable (111) is attached to said arm (28) by means of lugs (113). On the spindle (3) are loosely mounted the two arms (6) and (7), carrying rollers (23) running in diverging cam slots (24) of the cam plate (25) said cam plate being operated by the hand lever (31) in the same manner as shown in Fig. 1. The hand lever (31) is loosely mounted on the sleeve (58), and the lower part constitutes a separate arm (30) pivoted on studs (110) enabling said arm to swing with the cam plate (25) and arm (28) without interfering with the back and forward movement of the hand lever (31). Other parts being shown and designated with identical parts in the before described controls.

The arms (6) and (7) and the spindle (3), Figs. 1 and 4, are prevented from moving in an axial direction by the stop collars (114) mounted on the spindle (3).

The invention has now been described and shown as examples of its application but obviously can be carried out in different ways without departing from the principle.

I claim:—

1. In an airplane having ailerons and elevators and a lever for operating said ailerons and elevators, means to enable said elevators to be operated as ailerons by said lever but operated as elevators by said lever independently of the ailerons.

2. In an airplane having ailerons and elevators and a lever for operating said elevators and a handwheel mounted on said lever for operating the ailerons, means connected to said lever and said elevators enabling said elevators to be operated as ailerons by said lever but operated as elevators by said lever independently of the ailerons.

3. In an airplane having ailerons and elevators, a control lever for operating said elevators and ailerons, means connecting said elevators and ailerons to the control lever so that when the ailerons are operated by said lever the elevators will be operated at the same time and swing in opposite directions in unison with the ailerons and assist the ailerons in their fuction, but when the elevators are operated by the said lever so as to move together in the same direction the ailerons will be unaffected by said operation.

4. In an airplane having ailerons and elevators, a control lever for operating said elevators and a handwheel mounted on said control lever for operating the ailerons, means connecting said elevators to the control lever so that on twisting the control lever the elevators will swing in opposite directions but the ailerons will be unaffected by said operation.

5. In an airplane having ailerons and elevators, bearings, a spindle mounted in said bearings, transverse studs carried by said spindle, a control lever pivoted on said studs, the lower end of said control lever being bent forward, brackets, bosses pivoted on said brackets, the axes of the pivots being in alignment with the axes of aforesaid transverse studs carried by the spindle, bell crank levers pivoted on studs normally vertical and protruding from aforesaid bosses, a link connecting said bell crank levers, a bearing carried by said link, the lower end of the control lever being journalled in said bearing, horns mounted on the elevators and rods connecting said horns with aforesaid bell crank levers.

6. In an airplane having ailerons and elevators, bearings, a spindle mounted in said bearings, transverse studs carried by said spindle, a control lever pivoted on said studs, two arms loosely mounted on the spindle, brackets, bell crank levers pivoted on said brackets, horns mounted on the ailerons, links connecting the horns with the said bell crank levers, links connecting said bell crank levers with aforesaid arms, a hand lever pivoted on the aforesaid transverse studs, an arm rigidly mounted on the aforesaid spindle, a rod supported by the one end of the hand lever and journalled in a bearing carried by the said arm rigidly mounted on the spindle, a camplate with diverging camslots carried by the said rod, rollers carried by the aforesaid loosely mounted arms and situated in the camslots, and a spring for holding the camplate and arms in their normal position.

7. In an airplane having ailerons and elevators, bearings, a spindle mounted in said bearings, transverse studs carried by said spindle, a control lever pivoted on said studs, the lower end of said control lever being bent forward, brackets, bosses pivoted on said brackets, the axes of the pivots for said bosses being in alignment with the axes of the aforesaid transverse studs carried by the spindle, bell crank levers pivoted on studs normally vertical and protruding from aforesaid bosses, a link interconnecting said bell crank levers, a bearing carried by said link, the aforesaid lower end of the control lever being journalled in said bearing, horns mounted on the elevators, rods connecting said horns with aforesaid bell crank levers, two arms loosely mounted on the aforesaid spindle, brackets, bell crank levers pivoted on said brackets, horns mounted on the ailerons, links connecting the horns with said bell crank levers, links connecting said bell crank levers with aforesaid arms loosely mounted on the spindle, a hand lever pivoted on the aforesaid transverse studs carried by the spindle, an arm rigidly mounted on the spindle, a rod journalled in a bearing carried by said arm and supported by one end of aforesaid hand lever, a camplate having diverging camslots and carried by the said rod, rollers carried by the aforesaid arms loosely mounted on the spindle and situated in the camslots, and a spring to hold the camplate and the arms in their normal position.

8. In an airplane having elevators, a lever for operating said elevators and connecting means between said elevators and the operating lever, bell crank levers interposed in said connecting means and pivots for said bell crank levers to turn on, said pivots being supported so as to enable the bell crank levers to be swung, by means of the operating lever, bodily back or forward thereby causing the connecting means to move back or forward and the elevators to move together up or down or vice versa, but also so as to allow the bell crank levers to be turned on their pivots by means of the operating lever thereby causing the elevators, through the connecting means, to move in opposite directions.

9. In an airplane having ailerons and elevators, rigid supports, members pivoted on said supports and bell crank levers pivoted on said members so that the bell crank levers may be bodily swung with the aforesaid members but independently turned on their own pivots, means interconnecting said bell crank levers, control means, means connecting said control means with the bell crank levers and means connecting said bell crank levers with the elevators.

10. In an airplane having ailerons and elevators, supports, two arms pivoted on said supports, means connecting said arms with the ailerons, a camplate with cam slots mounted so that it can be moved laterally and longitudinally, members on said arms engaged and guided by said camplate, a control lever for operating said camplate, and means connecting said control lever with said camplate whereby the said camplate when moved laterally will cause the arms to rock together and move the ailerons, one up and the other down, and when said camplate is moved longitudinally the said arms will move further apart or closer together causing the ailerons to move together up or down.

IVAN ANDERSSON.